No. 833,839. PATENTED OCT. 23, 1906.
G. W. KING.
FRICTIONAL DRIVE MECHANISM.
APPLICATION FILED MAY 31, 1905.
2 SHEETS—SHEET 1.
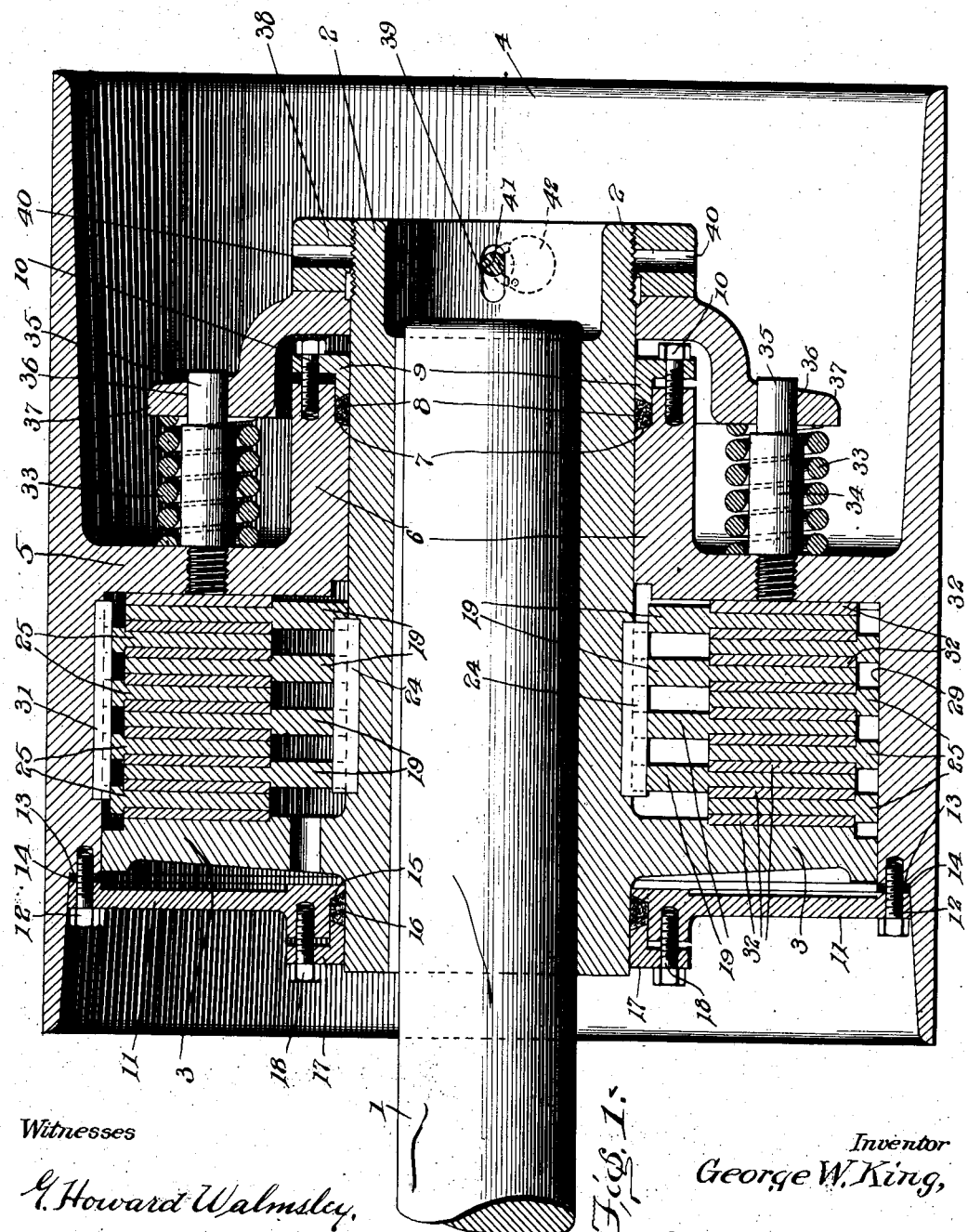
Witnesses
G. Howard Walmsley.
Irvine Miller.
Inventor
George W. King,
By
Attorney.

No. 833,839. PATENTED OCT. 23, 1906.
G. W. KING.
FRICTIONAL DRIVE MECHANISM.
APPLICATION FILED MAY 31, 1905.
2 SHEETS—SHEET 2.
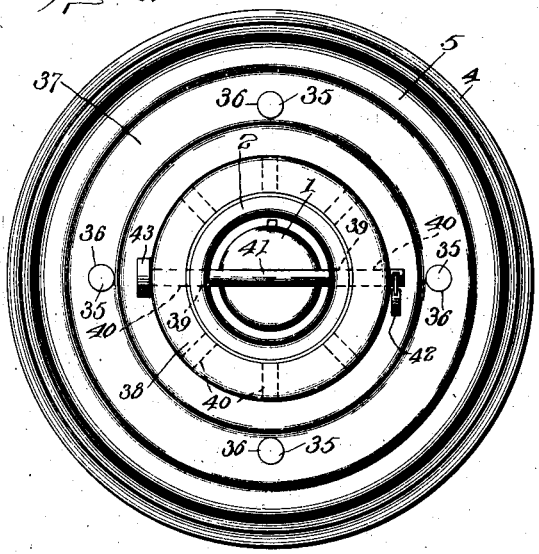
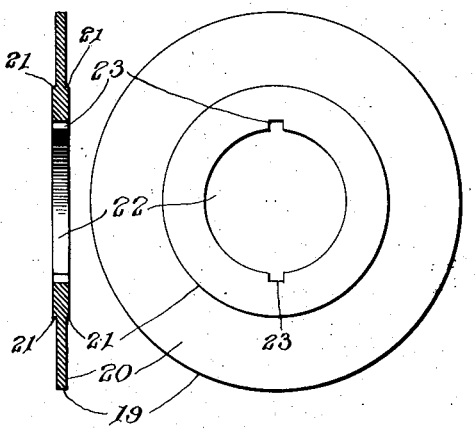
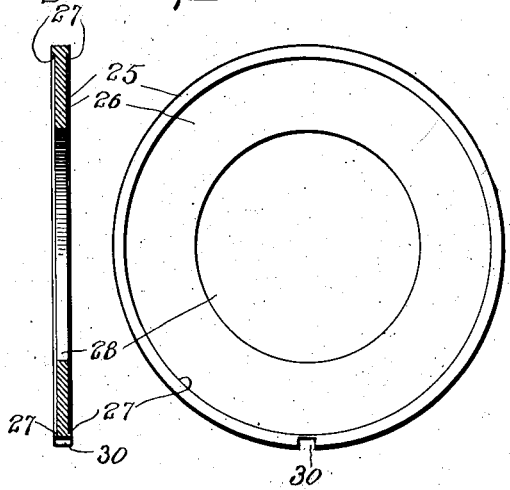
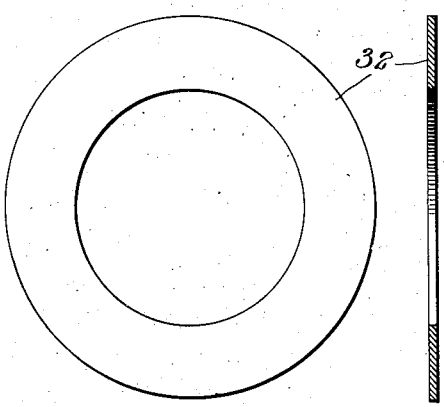
Witnesses
G. Howard Walmsley,
Irene Miller.
Inventor
George W. King,
By H. A. Toulmin.
Attorney

UNITED STATES PATENT OFFICE.

GEORGE W. KING, OF MARION, OHIO.

FRICTIONAL DRIVE MECHANISM.

No. 833,839.  Specification of Letters Patent.  Patented Oct. 23, 1906.

Application filed May 31, 1905. Serial No. 263,002.

*To all whom it may concern:*

Be it known that I, GEORGE W. KING, a citizen of the United States, residing at Marion, in the county of Marion and State of Ohio, have invented certain new and useful Improvements in Frictional Drive Mechanism, of which the following is a specification, reference being had therein to the accompanying drawings.

This invention relates to frictional drive mechanism, or, in other words, to mechanism which will transmit from a motor or other source of power to a driven part a predetermined amount of power, the transmission being frictional and being such that when the resistance of the driven part exceeds a predetermined amount the frictional elements will slip, thereby interrupting the transmission of power and preventing injury either to the driven mechanism or to the motor. Although capable of use in other connections, the frictional driving mechanism which I have devised is intended primarily for use in connection with electric motors. The use of such motors in certain kinds of work—such, for instance, as excavating—requires a provision of this kind to meet the conditions—as, for instance, where the excavating machinery comes into contact with a non-yielding substance, so that the friction drive mechanism will slip before the motor exerts its maximum power, which is usually sufficient to break the machinery. Where excessive resistance is met, it may result either in the heating of the motor which, as is well known, will exert from two to three times its rate of horse-power for a short time, whereas it should not be taxed over its rated capacity in order to insure its running cool, or it may result in the breakage of the machinery or the stalling of the motor. In this latter case the motor will burn out unless it is provided with a safety-fuse, and the replacing of these safety-fuses under working conditions is extremely difficult, causing so much loss of time that their use is practically prohibited. Electric motors used in connection with excavators and their machinery have heretofore been provided with friction-drives, usually the ordinary friction band and wheel, adjusted by a tensioning bolt or lever; but such frictional drive mechanisms have not been found capable of meeting all the conditions found in actual practice, since they are affected by various circumstances, such as different grades of lubrication, changes in atmospheric condition from dry to damp and the reverse, and changes in temperature arising not only from atmospheric conditions, but also from heat generated by the slipping of the frictional mechanism itself.

It is the object of my present invention to provide a frictional drive mechanism which shall be practically unaffected by changes in atmospheric conditions or conditions arising within the structure itself and which when once set or adjusted to transmit a given amount of power will remain in condition to accomplish that end regardless of the surrounding conditions which may tend to oppose that result.

Further objects of my present invention are to provide means for preventing unauthorized tampering with the adjustment of the device after it has been set for any desired load and to provide a compact and self-contained structure which, in its preferred form, is adapted to be applied directly to the motor-shaft to act as a driving-pulley, the construction being such that all of the parts are inclosed and protected.

To these and other ends my invention consists in certain novel features, which I will now proceed to describe and will then particularly point out in the claims.

In the accompanying drawings, Figure 1 is a central vertical sectional view of a structure embodying my invention in one form. Fig. 2 is an end view of the same, on a reduced scale. Fig. 3 is a view showing both in elevation and vertical section one of the friction-rings carried by the sleeve. Fig. 4 is a similar view illustrating one of the friction-rings carried by the pulley. Fig. 5 is a similar view illustrating one of the intermediate or free friction-rings. Fig. 3$^a$ is a vertical section taken centrally through Fig. 3. Fig. 4$^a$ is a vertical section taken centrally through Fig. 4, and Fig. 5$^a$ is a vertical section taken centrally through Fig. 5.

In the said drawings I have shown an embodiment of my invention in which the structure is in the form of a pulley adapted to be applied directly to the motor-shaft at the end thereof, although the invention is obviously capable of other embodiments and other locations.

In the said drawings, 1 indicates a shaft, preferably a motor-shaft.

2 indicates a sleeve which is keyed or otherwise secured upon the motor-shaft, so as to rotate in unison therewith, said sleeve having near its inner end a radial web or flange 3.

4 indicates the pulley proper, the rim of which is preferably of a width such as to inclose and protect all of the parts of the device, said pulley having a radial annular web or flange 5, connecting its rim with a sleeve 6, which forms the hub of the pulley proper and which fits and is free to slide upon the sleeve 2. The rim portion of the pulley fits and slides upon the periphery of the web or flange 3. The hub-sleeve 6 is provided at its outer end with a recess 7, which receives a packing 8, preferably of rawhide, thus forming a stuffing-box to make an oil-tight joint at this end between the sleeve and pulley, the same being completed by means of a gland 9, which may be tightened up by means of screw-bolts 10. At the other end of the device I provide a closure in the form of a cover-plate or end plate 11, the margin of which is secured to the rim of the pulley 4 by means of bolts 12, the pulley being provided with a shoulder 13, against which the cover-plate seats, and a packing 14 being interposed between the plate and shoulder to make an oil-tight joint. The plate 11 has a central opening to receive the inner end of the sleeve 2 and is there provided with a recess 15, which receives a packing 16, preferably of rawhide, the same forming, in conjunction with a gland 17 and adjusting-bolts 18, a stuffing-box which makes an oil-tight joint between the pulley and sleeve at their inner ends. Thus the space between the pulley-rim and sleeve and between the web 5 and cover-plate 11 constitutes an oil-tight space, which when the device is in use is filled with oil to form an oil-bath, in which the friction-rings travel.

The friction-rings just referred to are in three sets or groups, all free to move axially or in the direction of the length of the shaft 1, one set rotating with the shaft, the second set rotating with the pulley, and the third set intermediate the rings of the two other sets being free to rotate independently of both sleeve and pulley. The rings of the first set are indicated by the reference-numeral 19, one of these rings being shown in detail in Fig. 3 of the drawings. These rings are preferably of metal, cast-iron being preferred, and have friction-surfaces 20 on their opposite sides, terminating in shoulders 21. Each ring has a central aperture 22 for the passage of the sleeve, on which it fits loosely, and opposite grooves or keyways 23 to receive splines or keys 24, by which said rings are so connected to the sleeve as to rotate in unison therewith. The second set of rings are indicated by the reference-numeral 25 and are so arranged as to alternate with the rings 19. One of these rings is shown in detail in Fig. 4 of the drawings, and it will be seen that it is provided with friction-surfaces 26 on its opposite sides terminating in shoulders 27, said shoulders being inwardly directed, while the shoulders 21 of the first set of rings are outwardly directed. Each ring 25 has a large central aperture 28, through which the sleeve 2 passes loosely, so as to leave a large annular space between said sleeve and the inner margin of the ring 25. The rings 25 fit at their outer margins within a cylindrical surface 29, formed on the inner side of the pulley-rim, the periphery of the web or flange 3 also fitting against said cylindric surface. Each disk 25 has its periphery transversely grooved, as shown at 30, to receive a spline or key 31, carried by the pulley-rim, so that the disks 25 rotate along with the pulley, although free to move longitudinally or in the direction of the axis of rotation of the shaft 1. The third set of friction-rings (indicated by the reference-numeral 32 and shown in detail in Fig. 5) are flat annular bodies of a suitable friction material, such as indurated fiber, and are located between the adjacent rings of the other two sets, there being one ring 32 between each two disks 19 and 25. The rings 32 are of dimensions such as to fit against the friction-surfaces 20 and 26 of the rings 19 and 25, their inner edges abutting against the shoulders 21 of the rings 19 and their outer edges abutting against the shoulders 27 of the rings 25, by means of which shoulders these intermediate rings are held in properly-centered position with respect to the other parts.

The three series of rings just referred to abut at one end against the web or flange 3 and at the other end against the web or flange 5, which are provided with suitable friction-surfaces to receive the outermost rings, which are of the third or intermediate variety made of friction material. The web 3 is fixed against longitudinal movement; but the web 5 is movable longitudinally of the sleeve 2, being pressed against the end ring of the series to obtain the necessary friction by means of springs 33, which bear against the web 5 at one end and against a suitable abutment at the other end. In the present instance I have shown four of these springs, each in the form of a coiled or spiral spring mounted and supported upon a pin 34, which is threaded into or otherwise secured to the web 5, projecting outward therefrom through the coil of the spring and beyond the same. The projecting portions of the pins 34 (indicated by the reference-numeral 35) pass loosely through apertures 36 in an abutment-ring 37, which receives the thrust of the springs 34 in one direction. Said abutment-ring 37 is fitted loosely upon the sleeve 2, so as to be free to rotate and move longitudinally thereon, and the outward thrust which it receives from the springs causes it to bear against an abutment-nut 38, which is screwed onto the threaded outer end of the sleeve 2. It will be at once seen that by turning the nut 38 in one direction or the other upon the sleeve 2 the abutment-ring must be so adjusted as to increase or decrease the pressure exerted by the springs 33 upon the web 5, thereby regulating the amount of friction between the several friction-rings. It is by this means that the device is adjusted so as to transmit power up to a predetermined point, and when the resistance exceeds this power the friction-rings will slip upon each other, and the transmission of power will cease, thereby saving the machinery from injury and the motor from overload. It will be seen that all of the frictional surfaces are flooded with lubricant at all times, thus preventing them from being affected by variations in the amount of lubricating material, and since they are wholly and tightly inclosed, as well as entirely immersed in the lubricating liquid, they will not be affected by atmospheric changes, such as increase or decrease in moisture or temperature. What little heat may arise from the slipping on each other of the frictional parts may cause a slight expansion, which will be taken up by the yielding of the springs, which latter will also by their expansion take care of any contraction of the parts. It will also be observed that the total amount of frictional surface is very great when compared with the space occupied, as each ring has two frictional surfaces, and this is multiplied by the number of rings employed. By reason of this construction the full power of the motor may be transmitted with a minimum amount of pressure on the frictional surfaces, while it also results that when it is necessary for the frictional surfaces to slip upon each other the pressure on each individual surface is so light that no material cutting or wearing thereof occurs and but little heat is generated. It should also be noted that in actual practice as soon as the drive begins to slip the load is immediately removed or the motor is stopped, so that little chance of heating from this source exists.

In order to make provision for preventing any tampering with the mechanism after it has been adjusted for any desired load, I extend the sleeve 2 beyond the end of the shaft 1 and provide longitudinal slots 39 through diametrically opposite sides of this extension. The nut 38 is provided with a plurality of radial holes 40, and when the nut is adjusted to give the desired tension the nearest of these holes are brought to register with the slots 39. A pin 41 is then passed through the registering holes and slots and serves to hold the nut in adjusted position. Unauthorized removal of this pin is prevented by means of a padlock 42, which is passed through an opening in the unheaded projecting end of the pin and there locked and the key removed. The pin is provided with a head 43 at its other end or is otherwise so constructed as to prevent its withdrawal in one direction, while the padlock serves to prevent its withdrawal in the other direction, also serving as a cotter to prevent the working loose of the pin.

It will be seen that I have provided a friction-drive which can be adjusted to any desired load or resistance, which is unaffected by changes in temperature or atmospheric condition, and which is free from any variations arising from defective or excessive lubrication and also free from danger of overheating and excessive wear, while extremely sensitive and accurate as to its adjustment and requiring but a small absolute pressure to enable it to effect the transmission of great power. Practical use of the device over an extended period has demonstrated these characteristics.

Various modifications in the details of construction may be made without departing from the principle of my invention. For instance, while the particular embodiment of the invention herein shown and described, consisting of a pulley and sleeve having the friction devices between or upon them and adapted for application as a whole to a suitable shaft, is a desirable form, containing features of novelty hereinafter claimed, yet it is obvious that the invention is capable of other embodiments. I therefore do not wish to be understood as limiting myself to the precise details of construction hereinbefore described, and shown in the accompanying drawings.

Having thus fully described my invention, what I claim as new, and desire to secure by Letters Patent, is—

1. A frictional drive mechanism comprising two rotatory members, a hub carried by one of said members and engaging the other one of said members, said hub being axially movable thereon, each of said members being provided with a plurality of friction-rings rotating in unison therewith and axially movable relatively thereto, and with an abutment for said rings, the rings of said sets alternating with each other, and a spring acting between said members to cause the movable member to move the friction-rings toward each other, substantially as described.

2. In a frictional drive mechanism, the combination with a shaft, an inner member mounted thereon, a radial abutment carried by said member, an outer member, an annular abutment centrally arranged within said outer member, and a hub at the inner edge of said annular abutment adapted to slide upon said inner member, of friction-rings carried by each of said members and rotating in unison therewith and axially movable relatively thereto, a set of free friction-rings located between the adjacent rings of the inner and outer members, and a spring acting between said members to move said friction-rings into engagement with each other, substantially as described.

3. A frictional drive mechanism comprising two rotatory members, one of said members being axially movable relatively to the other, each of said members being provided with a plurality of friction-rings rotating in unison therewith and axially movable relatively thereto, and with an abutment for said rings, the rings of said sets alternating with each other, means located between said members and engaging the adjacent faces thereof for inclosing the space between the same in which said friction-rings lie to form an oil-tight chamber adapted to be filled with a lubricant, and a spring acting between said members to cause the movable member to move the friction-rings toward each other, substantially as described.

4. A frictional drive mechanism comprising two rotatory members, one of said members being axially movable relatively to the other, each of said members being provided with a plurality of friction-rings rotating in unison therewith and axially movable relatively thereto, and with an abutment for said rings, the rings of said sets alternating with each other, a third set of free friction-rings arranged between the adjacent rings of the other two sets, means located between said members and engaging the adjacent faces thereof for inclosing the space between the same in which the friction-rings are located to form an oil-tight chamber adapted to be filled with a lubricant, and a spring acting between said members to cause the movable member to force the friction-rings into engagement with each other, substantially as described.

5. A frictional drive mechanism comprising two rotatory members, a hub carried by one of said members and engaging the second member, said hub being axially movable thereon, each of said members being provided with a plurality of friction-rings rotating in unison therewith and axially movable relatively thereto, and with an abutment for said rings, the rings of said sets alternating with each other, and a spring acting between said members to cause the movable member to move the friction-rings toward each other, said spring being provided with means for regulating its pressure, substantially as described.

6. In a frictional drive mechanism, the combination, with a shaft, an inner member mounted thereon, a radial abutment carried by said member, an outer member, an annular abutment centrally arranged in said outer member, and a hub at the inner edge of said annular abutment adapted to slide upon said inner member, friction-rings carried by each of said members and rotating in unison therewith and axially movable relatively thereto, a set of free friction-rings located between the adjacent rings of the inner and outer members, a spring acting between said members to move said friction-rings into engagement with each other, and means for regulating the tension of said spring, substantially as described.

7. A frictional drive mechanism comprising two rotatory members, one of said members being axially movable relatively to the other, each of said members being provided with a plurality of friction-rings rotating in unison therewith and axially movable relatively thereto, and with an abutment for said rings, the rings of said sets alternating with each other, means located between said members and engaging the adjacent faces thereof for inclosing the space between the same in which said friction-rings lie to form an oil-tight chamber adapted to be filled with a lubricant, and a spring acting between said members to cause the movable member to move the friction-rings toward each other, said spring being provided with means for regulating its pressure, substantially as described.

8. A frictional drive mechanism comprising two rotatory members, one of said members being axially movable relatively to the other, each of said members being provided with a plurality of friction-rings rotating in unison therewith and axially movable relatively thereto, and with an abutment for said rings, the rings of said sets alternating with each other, a third set of free friction-rings, arranged between the adjacent rings of the other two sets, means located between said members and engaging the adjacent faces thereof for inclosing the space between the same in which the friction-rings are located to form an oil-tight chamber adapted to be filled with a lubricant, and a spring acting between said members to cause the movable member to force the friction-rings into engagement with each other, said spring being provided with means for regulating its pressure, substantially as described.

9. A frictional drive mechanism comprising an inner and an outer rotatory member, the latter axially movable relatively to the former, each of said members being provided with a plurality of friction-rings rotating in unison therewith and axially movable relatively thereto, and with a flange or web forming an abutment for said rings, the rings of said sets alternating with each other, the outer member inclosing said friction-rings and forming with the inner member an oil-tight chamber adapted to be filled with a lubricant, an abutment adjustable on the inner member, and springs acting between said abutment and the flange or web of the outer member, substantially as described.

10. A frictional drive mechanism comprising an inner and an outer rotatory member, the latter axially movable relatively to the former, each of said members being provided with a plurality of friction-rings rotating in unison therewith and axially movable relatively thereto, and with a flange or web forming an abutment for said rings, the rings of said sets alternating with each other, and a third set of free friction-rings located between the adjacent rings of the other two sets, the outer member inclosing said friction-rings and forming with the inner member an oil-tight chamber adapted to be filled with a lubricant, an abutment adjustable on the inner member, and springs acting between said abutment and the flange or web of the outer member to force the friction-rings into engagement with each other, substantially as described.

11. A frictional drive mechanism in the form of a pulley adapted for application to a standard shaft, said mechanism comprising a sleeve adapted to be secured to the shaft and having an outwardly-extending web or flange, a plurality of friction-rings splined thereon, and an adjustable spring-abutment, and an outer member in the form of a pulley having a rim, an inwardly-extending web or flange, a hub-sleeve fitting on the inner sleeve, and a plurality of friction-rings splined thereto and alternating with those of the sleeve, a plurality of independent friction-rings being located between the adjacent rings of the other two sets, said pulley proper being provided with an end plate or cover, and said end plate and hub-sleeve being provided with stuffing-boxes fitting on the inner sleeve, whereby an oil-tight chamber for the friction-rings is provided, and springs carried by the pulley proper and acting against the adjustable abutment of the inner sleeve, substantially as described.

12. In a frictional drive mechanism of the character described, the combination, with the inner and outer members, friction-rings carried thereby and provided respectively with outwardly and inwardly directed shoulders, of independent friction-rings fitting between the adjacent rings of the two other sets and held in position by the shoulders thereof, substantially as described.

13. In a frictional drive mechanism of the character described, the combination, with inner and outer members having webs or flanges and interposed friction-rings, of an abutment-nut threaded on the inner member, an abutment-ring loosely mounted on the inner member and bearing against said nut, pins mounted on the web or flange of the outer member and extending loosely through said abutment-ring, and springs mounted on said pins and bearing against said ring and web or flange, substantially as described.

14. In a frictional drive mechanism of the character described, the combination, with two members having coöperating friction-surfaces, one of members being movable axially of the other, a spring or springs acting on the movable member, and an adjustable spring-abutment on the other member, of means for locking said abutment against unauthorized adjustment, substantially as described.

15. A frictional drive mechanism of the character described, comprising two members having coöperating friction-surfaces, a spring-abutment mounted on one of the members and consisting of a nut threaded on said member and provided with a plurality of radial apertures, the member being correspondingly threaded and slotted longitudinally, in combination with a pin constructed to prevent its withdrawal in one direction, and a removable lock applied to said pin to prevent its withdrawal in the other direction, substantially as described.

16. A frictional drive mechanism in the form of a pulley adapted for application to a standard shaft, said mechanism comprising a sleeve adapted to be secured to the shaft and having an outwardly-extending web or flange, a plurality of friction-rings splined thereon, and an adjustable spring-abutment, and an outer member in the form of a pulley having a rim, an inwardly-extending web or flange, a hub-sleeve fitting on the inner sleeve, and a plurality of friction-rings splined thereto and alternating with those of the sleeve, said pulley proper being provided with an end plate or cover, and said end plate and hub-sleeve being provided with stuffing-boxes fitting on the inner sleeve, whereby an oil-tight chamber for the friction-rings is provided, and springs carried by the pulley proper and acting against the adjustable abutment of the inner sleeve, substantially as described.

17. A frictional drive mechanism comprising two rotatory members having engaging frictional surfaces and forming an oil-tight chamber between the walls thereof and inclosing said surfaces and containing oil, whereby said surfaces are immersed in a bath of oil to prevent variations in their lubrication and to prevent atmospheric changes from affecting the frictional relations of said surfaces, substantially as described.

18. A frictional drive mechanism comprising two rotatory members having engaging frictional surfaces, said members forming an oil-tight chamber inclosing said surfaces and containing oil to form an oil-bath in which said surfaces are immersed, to prevent variations in lubrication or atmospheric conditions from affecting their frictional relation, a spring acting to cause the frictional engagement of said surfaces, means for adjusting said spring to control the force with which it acts, and means for locking said adjusting mechanism against unauthorized manipulation, substantially as described.

In testimony whereof I affix my signature in presence of two witnesses.

GEORGE W. KING

Witnesses:
ROBERT G. LUCAS,
WILLIAM R. SHISLER.